(12) United States Patent
Burke et al.

(10) Patent No.: US 9,651,682 B2
(45) Date of Patent: May 16, 2017

(54) DEVICE AND METHOD OF SCINTILLATING QUANTUM DOTS FOR RADIATION IMAGING

(71) Applicant: The United States of America as represented by the Administrator of the National Aeronautics and Space Administration, Washington, DC (US)

(72) Inventors: Eric R. Burke, Yorktown, VA (US); Stanton L. DeHaven, Hampton, VA (US); Phillip A. Williams, Suffolk, VA (US)

(73) Assignee: THE UNITED STATES OF AMERICA AS REPRESENTED BY THE ADMINISTRATOR OF THE NATIONAL AERONAUTICS AND SPACE ADMINISTRATION, Washington, DC (US)

( * ) Notice: Subject to any disclaimer, the term of this patent is extended or adjusted under 35 U.S.C. 154(b) by 158 days.

(21) Appl. No.: 14/617,013

(22) Filed: Feb. 9, 2015

(65) Prior Publication Data
US 2016/0231440 A1    Aug. 11, 2016

(51) Int. Cl.
| | | |
|---|---|---|
| H05G 1/64 | (2006.01) |
| G01T 1/20 | (2006.01) |
| B29D 11/00 | (2006.01) |
| G01T 1/16 | (2006.01) |
| B29K 105/16 | (2006.01) |

(Continued)

(52) U.S. Cl.
CPC ........ *G01T 1/2002* (2013.01); *B29D 11/0074* (2013.01); *G01T 1/16* (2013.01); *G01T 1/2018* (2013.01); *B29K 2105/162* (2013.01); *B29K 2509/00* (2013.01); *B29K 2995/0026* (2013.01); *B29K 2995/0035* (2013.01); *B29L 2011/0075* (2013.01)

(58) Field of Classification Search
CPC ......... G01N 23/04; G01T 1/2002; G01T 1/16; G01T 1/2018; B29D 11/0074
USPC ....................................... 378/98.8
See application file for complete search history.

(56) References Cited

U.S. PATENT DOCUMENTS

| | | | |
|---|---|---|---|
| 7,362,938 B1 | 4/2008 | Herz et al. | |
| 8,816,287 B2 * | 8/2014 | Weinberg ................. | G01T 1/16 250/370.01 |

(Continued)

OTHER PUBLICATIONS

Lawrence, William G. et al., "Quantum Dot-Organic Polymer Composite Materials for Radiation Detection and Imaging," IEEE Transactions on Nuclear Science, Feb. 2012, pp. 215-221, vol. 59, No. 1.

(Continued)

*Primary Examiner* — Courtney Thomas
(74) *Attorney, Agent, or Firm* — Andrea Z. Warmbier

(57) ABSTRACT

A radiation imaging device includes a radiation source and a micro structured detector comprising a material defining a surface that faces the radiation source. The material includes a plurality of discreet cavities having openings in the surface. The detector also includes a plurality of quantum dots disclosed in the cavities. The quantum dots are configured to interact with radiation from the radiation source, and to emit visible photons that indicate the presence of radiation. A digital camera and optics may be used to capture images formed by the detector in response to exposure to radiation.

20 Claims, 3 Drawing Sheets

(51) Int. Cl.
　　　*B29K 509/00*　　　(2006.01)
　　　*B29L 11/00*　　　(2006.01)

(56) References Cited

U.S. PATENT DOCUMENTS

| | | |
|---|---|---|
| 2013/0187053 A1 | 7/2013 | Colby |
| 2014/0021368 A1 | 1/2014 | Chakravarthy et al. |
| 2014/0110592 A1* | 4/2014 | Nelson ................. G01T 1/1611 |
| | | 250/370.09 |

OTHER PUBLICATIONS

Burke, Eric et al., "Scintillating Quantum Dots for Imaging X-Rays (SQDIX) for Aircraft Inspection" ARMD Seedling Fund: Phase I, Feb. 21, 2014.

Burke, Eric et al., "Scintillating Quantum Dots for Imaging X-Rays (SQDIX) for Aircraft Inspection" ARMD Seedling Fund: Phase II, Feb. 21, 2014.

\* cited by examiner

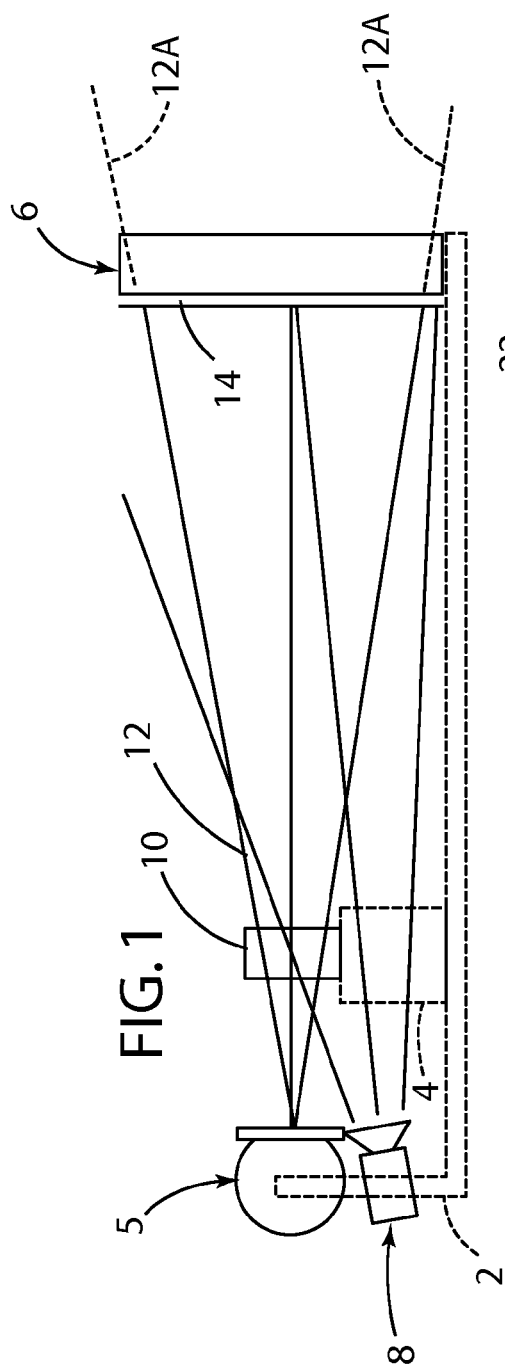
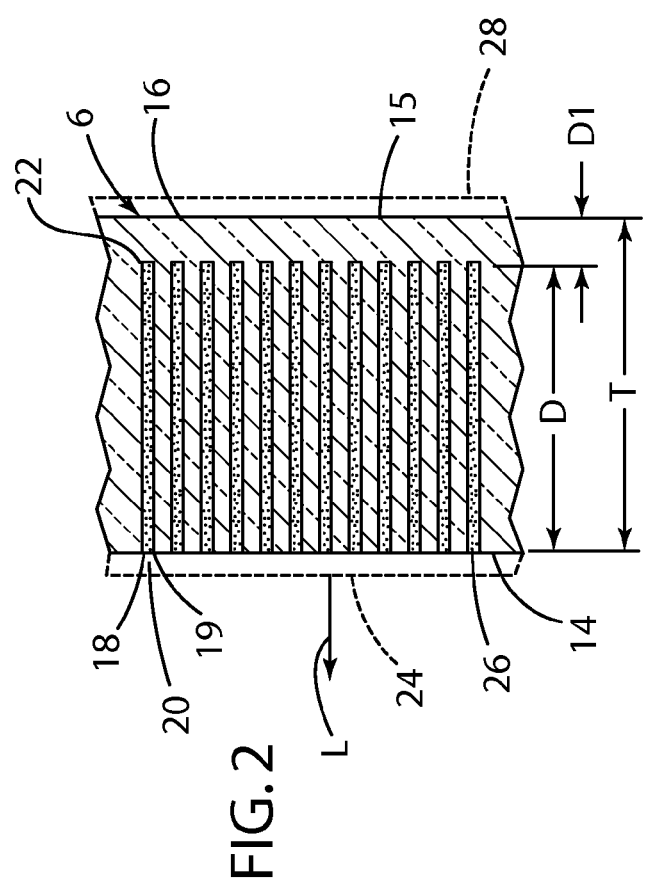

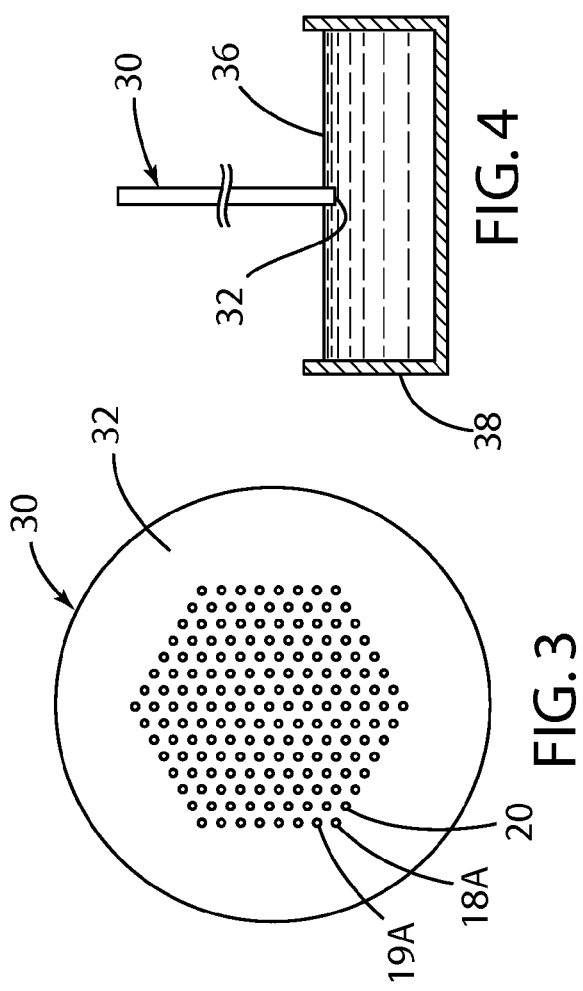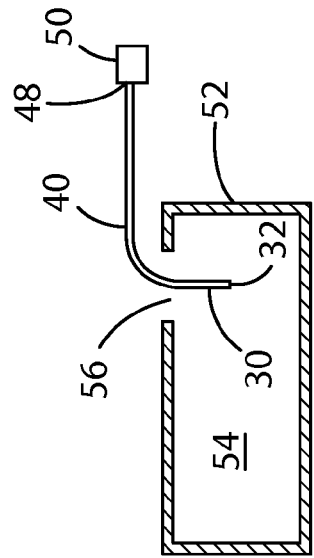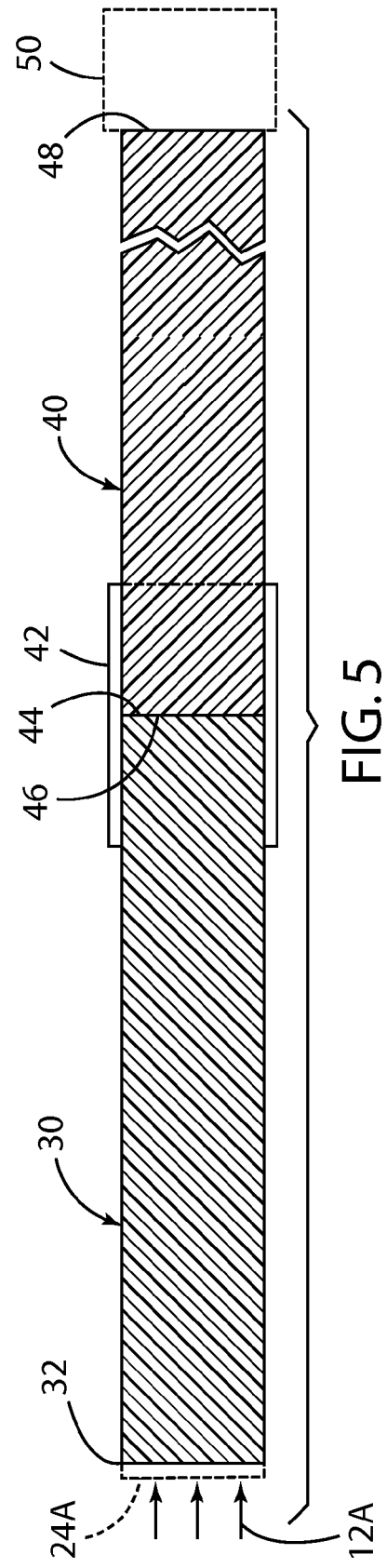

DEVICE AND METHOD OF SCINTILLATING QUANTUM DOTS FOR RADIATION IMAGING

STATEMENT REGARDING FEDERALLY SPONSORED RESEARCH OR DEVELOPMENT

The invention described herein was made by employees of the United States Government and may be manufactured and used by or for the Government of the United States of America for governmental purposes without the payment of any royalties thereon or therefore.

FIELD OF THE INVENTION

This invention relates to radiation imaging, and in particular it relates to utilizing scintillating quantum dots or nano-crystals (StQDs) for imaging X-rays and other forms of radiation.

BACKGROUND OF THE INVENTION

Conventional X-ray imaging utilizes photographic plates that are sensitive to X-rays. Photostimulable phosphor (PSP) plates which utilize release of stored energy within a phosphor have also been developed for X-ray imaging. A PSP plate can be used to record a two-dimensional image corresponding to the intensity of the X-ray radiation, PSP plates may be utilized in computed radiography equipment to provide X-ray imaging in medical applications.

Semiconductor detectors have also been developed. In this type of detector, X-ray photons are converted to electron-hole pairs in the semiconductor and collected to detect the X-rays. These detectors may be utilized in energy dispersive X-ray spectroscopy and X-ray imaging.

In addition to the X-ray imaging processes discussed above, scintillators may also be utilized. For example, materials such as sodium iodide produce a visible photon when exposed to X-rays. An electronic detector with the scintillating materials can be built by utilizing a photomultiplier.

Scintillating quantum dots or nano-crystals (StQDs) are a nanometer-scale material that absorb and re-emit energy as visible light upon excitation by X-rays. StQDs have higher output efficiency than conventional scintillating materials. Quantum dot-polymer composites have been developed for use in photovoltaic cells, electro-luminescent devices, and scintillation detectors for ionizing radiation.

However, known radiation detection devices and methods may suffer from various drawbacks.

BRIEF SUMMARY OF THE INVENTION

One aspect of the present invention is a radiation-imaging device including a radiation source such as an X-ray generator that is configured to generate a beam of X-rays that may be generally or substantially cone-shaped. The device also includes a micro structured radiation detector comprising a material defining a surface that faces the radiation source. The material includes a plurality of discreet cavities having openings in the surface. The detector also includes a plurality of quantum dots disposed in the cavities. The quantum dots are configured to interact with radiation from the source, and to emit visible photons in the direction of the detecting device. The cavities are configured such that light is directed using internal reflection perpendicular to the detection face. Using the internally reflecting structure causes emitted photons to be concentrated in the direction of a detector. The material may be in the form of a glass, polymeric material, silicon or quartz plate, and the openings may extend through the plate, or the openings may be a "blind" hole or "well" having a depth that is less than a thickness of the plate. Alternatively, the holes may extend through the material, and the holes may be backed with one or more first surface mirrors. The quantum dots may be crystalized in the cavities, and the quantum dots are configured to emit visible photons when exposed to X-ray radiation or other types of radiation.

Another aspect of the present invention is a radiation detector including a micro structured material having a surface and a plurality of cavities extending from openings in the surface into the material. A plurality of quantum dots are disposed in the cavities. The quantum dots are configured to emit visible photons upon interaction with radiation. The quantum dots may be configured to emit visible photons upon interaction with at least one of electron radiation, gamma radiation, beta radiation, and alpha radiation.

Another aspect of the present invention is a method of making a radiation detector. The method includes providing a liquid solution comprising quantum dots. The liquid solution is drawn into one or more cavities utilizing a capillary or vacuum action, and the liquid solution is solidified in the at least one cavity. The liquid solution may include at least about 30 wt % quantum dots at the time the liquid solution is drawn into the one or more cavities.

Another aspect of the present invention is a method of providing radiation shielding. The method includes providing a liquid solution comprising quantum dots. The liquid solution is applied to a surface, and the liquid solution is cured to form a solid layer of radiation-absorbing material on the surface. The layer of radiation-absorbing material comprises a plurality of quantum dots dispersed throughout a solid matrix material. The solid matrix material may be light-transmitting (e.g. transparent or translucent).

Yet another aspect of the present invention is a radiation-responsive structure including a composite material including a matrix material and a plurality of fibers and quantum dots disposed in the matrix. The radiation-responsive structure may be configured to emit visible light when exposed to radiation.

These and other features, advantages, and objects of the present invention will be further understood and appreciated by those skilled in the art by reference to the following specification, claims, and appended drawings.

BRIEF DESCRIPTION OF THE SEVERAL VIEWS OF THE DRAWINGS

FIG. 1 is a schematic view of a radiation-imaging device according to one aspect of the present invention;

FIG. 2 is a partially schematic fragmentary (side) cross sectional view of a portion of the radiation detector/imaging device of FIG. 1;

FIG. 3 is an end view of an optical fiber having microstructured openings or cavities therein with quantum dots disposed in the openings or cavities;

FIG. 4 is a fragmentary schematic view showing an end of a microstructured fiber disposed in a liquid solution containing quantum dots whereby the solution is drawn into the openings of the fiber due to capillary action;

FIG. 5 is a partially schematic fragmentary cross sectional view of a microstructured fiber that is coupled to a light-transmitting fiber;

FIG. 6 is a schematic view of the fiber of FIG. 5 utilized in a remote detection/imaging application.

DETAILED DESCRIPTION OF THE INVENTION

Figure 7:
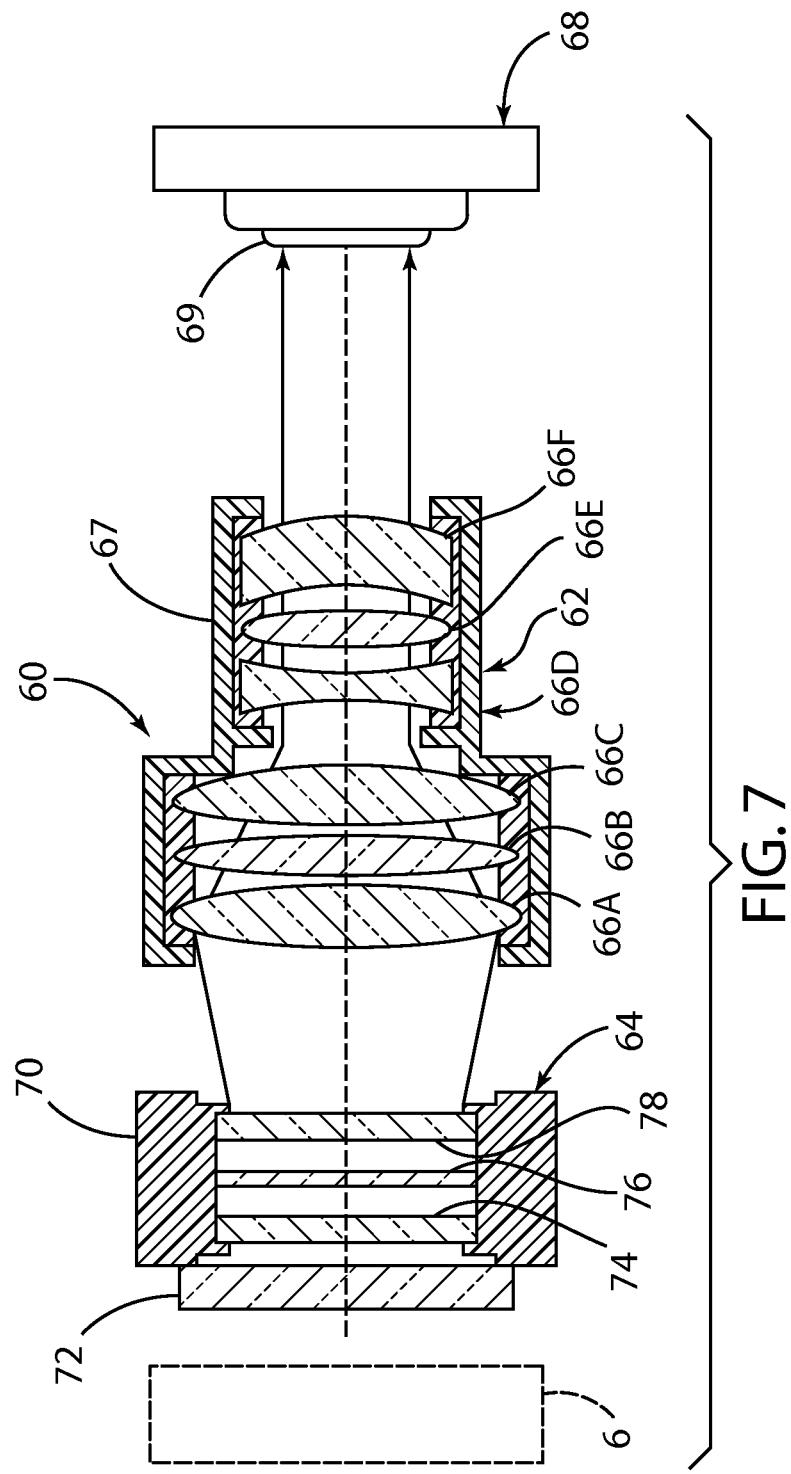
FIG. 7 is a schematic view of an optical assembly according to an embodiment of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, radiation-imaging device 1 includes a radiation source 5, a detector 6, and an optical detector or imaging device such as digital camera and optics 8. The radiation source 5 may be configured to generate radiation beam 12 (e.g. X-rays) that pass through an object 10 prior to incidence of the radiation beam 12 on surface 14 of detector 6. As shown schematically by the dashed lines designated 12A, a portion 12A of the radiation beam 12 may pass through the detector 6. As discussed in more detail below in connection with FIG. 2, detector 6 may comprise a microstructured plate 16 having a plurality of cavities 18 with openings 19 at surface 14 of microstructured plate 16. A plurality of scintillating quantum dots (StQDs) 20 are disposed in the cavities 18.

Referring again to FIG. 1, the radiation beam 12 causes the quantum dots 20 to emit visible light that is generally directed perpendicular to the surface 14 towards a digital camera and optics 8. Digital camera and optics 8 generate digital images utilizing the visible light emitted by the quantum dots 20 of detector 6.

Referring again to FIG. 2, detector 6 may comprise a microstructured plate 16. The microstructured plate 16 preferably comprises a uniformly structured material such as glass, polymeric material, silicon or quartz having the ability to be uniformly manipulated to form an array of cavities 18. Surfaces 14 and 15 of plate 16 are spaced apart to define a thickness "T." The wells or cavities 18 may be generally cylindrical and extend to a depth "D." Alternatively, the cavities may be non-cylindrical with square, rectangular, hexagonal, or other sidewall geometries. The cavities 18 may all have the same depth "D," or they may have different depths. The bottom surfaces 22 of the cavities 18 are spaced apart from the second surface 15 by a distance T−D=D1. The shape, size, and spacing of cavities 18 may be selected to provide a distribution of emitted light as required for a particular application. Although the size and spacing of cavities 18 may vary, in an exemplary embodiment the cavities 18 have a diameter of about 2 microns, and the center-to-center distance between adjacent cavities 18 is also about 2 microns. In general, the cavities are about 0.00001 inches to about 0.25 inches across (e.g. diameter), with a spacing of about 0.000001 to about 0.1 inches between cavities 18. A protective layer of material 24 may optionally be disposed on the first surface 14 to close off the openings 19 of cavities 18. The protective layer 24 may comprise a clear polymer material, glass, or other suitable material.

During fabrication of detector 6 scintillating quantum dots (StQDs) are initially disposed in a liquid. The liquid may comprise toluene, chloroform or other suitable liquid, and the concentration of StQDs is preferably in a range of about 30-55 wt %. The surface 14 of microstructured plate 16 is brought into contact with the liquid StQD solution, and the StQD solution is drawn into the cavities 18 by capillary action or mechanical pressure. The liquid (e.g. toluene) is then allowed to evaporate, causing the quantum dots 20 to crystalize in the cavities 18. Microstructured plate 16 may be heated to facilitate evaporation of the liquid.

As discussed above, an optional protective layer 24 comprising clear polymer or the like may then be formed or positioned over the surface 14 of microstructured plate 16 to close off/protect the openings 19 of cavities 18. Cylindrical side surfaces 26 of cavities 18 and the bottom surface 22 of cavities 18 are preferably at least somewhat reflective such that visible light emitted from quantum dots 20 is reflected within the cavities 18 until it escapes from opening 19 of cavities 18 in a direction that is generally orthogonal to the surface 14 as shown by the arrow "L." Although the cavities 18 preferably form wells having a depth "D," the cavities 18 may extend through microstructured plate 16 to thereby form openings (not shown) on second surface 15. A mirror 28 may optionally be positioned over second surface 15 to reflect light back into cavities 18 if cavities 18 extend all the way through plate 16 to surface 15.

The liquid quantum dot solution may comprise ZnSMn quantum dots in a toluene or chloroform solution. The specific composition and size of the quantum dots can be adjusted as required to provide the necessary visible light in response to interacting with radiation. Suitable quantum dot solutions can be obtained from Mesolight Inc. of Little Rock, Ark. In a preferred embodiment, the radiation source 5 provides a beam 12 of X-ray radiation. However, radiation source 5 may emit electron radiation, gamma radiation, beta radiation or alpha radiation. The composition and size of the quantum dots 20 may be selected to provide a desired optical light in response to the radiation. For example, the quantum dots 20 may be selected to emit light having a specific wave length (color) in response to the radiation. The quantum dots may also be configured to emit visible light when exposed to ultraviolet (UV) light. In this case, the source 5 (FIG. 1) comprises a UV light source.

Referring again to FIG. 1, the optical detector or imaging device 8 may comprise a high-speed digital camera operating at 30 Hz or higher frequencies. The quantum dots 20 may be selected to have very short re-emission periods (e.g. on the order of nanoseconds). Thus, if object 10 comprises a moving part (e.g. a spinning component of an aircraft engine), rapid changes in the intensity of the radiation beam 12 will result. Because the quantum dots respond quickly to changes in radiation levels, the images produced by the detector 6 may also vary rapidly with time. The use of a high-speed digital camera and optics 8 permits capture of rapidly changing images generated by detector 6. Because the quantum dots 20 of detector 6 produce light in the visible spectrum, the digital camera and optics 8 may comprise a conventional digital camera configured to generate digital images in the visible spectrum. Digital camera and optics 8 may be operably connected to a computer or other suitable device to provide for processing of the digital images produced by camera 8.

The very small size of the cavities 18 and the very close spacing between the cavities 18 permits the detector 6 to produce a high resolution image corresponding to variations in the intensity of the radiation beam 12 after it passes through object 10. Each of the cavities 18 forms an individual light source that may correspond to a pixel in a digital image. It will be understood that the size and spacing of the cavities 18 may be adjusted as required for a particular application.

Object 10 (FIG. 1) may comprise an aircraft component that is imaged utilizing X-rays for inspection purposes. The size of the detector 6 may be adjusted/selected as required for a particular application. The radiation source 5, detector 6, and optical detector or imaging device 8 may be mounted to a suitable structure 2 that provides for the proper orientation and spacing between the components. The structure 2 may optionally include a support 4 that supports the object 10 during the inspection process. Alternatively, if the object 10 comprises a large component or assembly (e.g. an aircraft engine or wing structure), structure 2 may comprise a portable structure that is positioned with the object 10 between the radiation source 5 and detector 6 to thereby permit X-ray inspection. The radiation-imaging device 1 may be configured to utilize X-rays for the detection of, for example, micro cracking in composites, for X-ray inspection of in-service turbine engines, or for medical X-ray imaging. Also, the radiation-imaging device 1 of FIG. 1 may be utilized to screen for objects such as explosives or weapons. For example, the radiation-imaging device 1 of FIG. 1 may be utilized at an airport or other such facility to scan luggage. Similarly, the radiation-imaging device 1 of FIG. 1 may also be utilized to scan containers at ports or the like. A radiation imaging device 1 of FIG. 1 may also be configured for medical imaging in which case object 10 comprises an organic structure such as a portion of a human or animal body. Because the quantum dots of detector 6 may be configured to provide greater sensitivity to radiation than that of conventional X-ray detectors, the source 5 may have relatively low X-ray radiation flux. This low X-ray radiation flux reduces the exposure of a patient to radiation in medical imaging applications.

Referring again to FIG. 1, the position of the radiation source 5, object 10, and detector 6 causes the image on surface 14 of detector 6 to be larger than the dimensions of the object 10. The position of the components relative to one another can be adjusted to change the degree of magnification. For example, if the detector 6 is positioned closer to the object 10, the image generated at surface 14 of detector 6 will be smaller, but the image will have a higher resolution. Thus, the desired image magnification and resolution can be adjusted by changing the relative position of the components in the setup of FIG. 1. In addition the use of zooming optics attached to the optical detector and imaging device 8 such as a digital camera may be used to provide higher resolution images.

A microstructured optical fiber 30 (FIG. 3) according to another aspect of the present invention includes an end surface 32. A plurality of cavities 18A in optical fiber 30 have openings 19A at surface 32. In a preferred embodiment, the cavities 18A are cylindrical, and have a diameter of about 2 microns. The openings 19A may be spaced apart a distance of about 2 microns center-to-center. As shown in FIG. 3, the cavities 18A may be disposed in uniform rows. It will be understood that the cavities 18 of detector 6 (FIG. 2) may, optionally, be arranged in a pattern that is substantially identical to the pattern shown in FIG. 3. In general, the cavities may have virtually any shape/configuration and may be arranged in virtually any pattern that provides a suitable light distribution for a particular application. The microstructured optical fiber 30 preferably comprises a glass fiber. However, the fiber 30 may comprise other suitable materials as required for a particular application.

With further reference to FIG. 4, during fabrication end 32 of fiber 30 is positioned in a solution 36 that is in a container 38. Solution 36 comprises toluene or other liquid with StQDs disposed in the solution at a concentration of about 30-50 wt %. The solution 36 is drawn into the cavities 18A by a capillary action. The toluene or other liquid is then allowed to evaporate, thereby crystallizing the StQDs in the cavities 18A. The end surface 32 may be optionally covered by a layer 24A (FIG. 5) of transparent or light-transmitting protective material.

As shown in FIG. 5, microstructured optical fiber 30 may be optically coupled to a light-transmitting fiber 40 by a suitable connector 42. The end 44 of fiber 30 is positioned directly adjacent end 46 of optical fiber 40 such that light generated by the quantum dots 20 disposed in cavities 18A is transmitted from microstructured optical fiber 30 into light-transmitting optical fiber 40. The cavities 18A may extend from end 32 of microstructured optical fiber 30 to the opposite end 44 of microstructured optical fiber 30. The end 48 of light-transmitting optical fiber 40 may be operably connected to an optical detector 50 to thereby generate images due to the visible light emitted by quantum dots 20 disposed in cavities 18A.

With further reference to FIG. 6, the optical fibers 30 and 40 may be utilized as a remote radiation detector or imaging device. For example, a structure 52 may include an internal space 54 having a relatively high radiation level. The end 32 of optical fiber 30 may be inserted through an opening 56 in structure 52 whereby the end 32 of microstructured optical fiber 30 is disposed in the interior space 54 of structure 52. If radiation is present in the interior space 54 of structure 52, the radiation will cause the quantum dots 20 to emit visible light that is transmitted through optical fiber 40 to the detector 50. The optical fiber 40 may be relatively long (e.g. 100 feet or more), and the end 32 of optical fiber 30 may be positioned in the cavity 54 utilizing a remotely-controlled mechanical device. In this way, a user can be positioned remotely (e.g. adjacent optical detector 50) such that the operator is not exposed to the high radiation levels present in the space 54 of structure 52. For example, the optical fiber arrangement of FIG. 6 could be utilized to inspect nuclear power facilities or the like.

Referring again to FIGS. 3 and 5, a plurality of microstructured optical fibers 30 may also be positioned directly adjacent one another in a bundle. In this way, the microstructured optical fibers 30 can be utilized to form a relatively large detector 6 that can be utilized in a manner similar to the microstructured plate 16 of FIG. 2.

According to another aspect of the present invention, the quantum dots may be initially disposed in a paint type solution. The paint may be applied to the surface of an aircraft or other item. If the aircraft or other item is exposed to radiation, it will emit visible light, thereby providing an indication or alert that the object is exposed to radiation. Furthermore, if an outer surface of an aircraft is coated with the quantum dot paint, the paint may be utilized to provide radiation shielding. As discussed above, the quantum dots can be configured to absorb various types of radiation, and the StQDs can therefore be utilized in a coating to provide radiation shielding at specific radiation frequencies or for specific types of radiation.

According to yet another aspect of the present invention, an aircraft structure or the like (not shown) may be fabricated from a composite material. For example, a component may comprise a composite material having a polymer matrix and carbon fibers. Quantum dots may be disposed in the polymer matrix prior to curing of the polymer material. If the structure is exposed to X-rays, the quantum dots will generate visible light. In this way, the part can be inspected by exposing the part to X-ray radiation. For example, referring again to FIG. 1, if object 10 comprises a composite material having quantum dots disposed therein, the object 10 can be positioned so that radiation beam 12 is incident on the object 10, and an optical detector or imaging device 8 such as a digital camera and optics can then be utilized to generate images for inspection purposes. If the object 10 comprises a composite component of this type, the detector 6 would not necessarily need to be utilized to generate images that can be captured by the digital camera and optics 8.

With further reference to FIG. 7, an optical assembly 60 according to another aspect of the present invention includes a zooming optical subassembly 62, an image intensifier 64 and an optical detector such as CCD camera 68. Zooming optical subassembly 62 includes a housing 67 and one or more lenses 66A-66F. It will be understood that the configuration of zooming optical subassembly 62 will vary depending on the requirements of a particular application. Image intensifier 64 may comprise a housing 70, protective (clear) cover 72, photocathode 74, multichannel plate 76, and phosphor screen 78. The optical assembly of FIG. 7 may comprise an ICCD camera available from Stanford Computer Optics, Inc. of Berkeley, Calif. In the illustrated example, the image intensifier 64 is utilized in the optical assembly 60 to multiply the available photon count. It will be understood that the order and distances of these components may vary according to the requirements of a particular application. Furthermore, not all of the components illustrated in FIG. 7 are required. For example, the image intensifier 64 may be used without the zooming optical subassembly 62. Alternatively, zooming optical subassembly 62 may be used without the image intensifier 64.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An X-ray imaging device, comprising:
an X-ray generator configured to generate a beam of X-rays;
a microstructured X-ray detector comprising a material defining a first surface that faces the X-ray generator and a second surface opposite the first surface, the material including a plurality of discrete cavities having openings defined in the first surface and that extend from the first surface to the second surface and define openings in the second surface, the detector further including a mirror disposed on the second surface covering the openings in the second surface, the detector further including a plurality of quantum dots disposed in the plurality of discrete cavities, wherein the quantum dots are configured to interact with X-ray radiation from the X-ray generator and emit visible photons.

2. The X-ray imaging device of claim 1, wherein:
the X-ray detector comprises at least one elongated optical fiber having a first end defining the surface.

3. The X-ray imaging device of claim 2, wherein:
the X-ray detector comprises a plurality of elongated optical fibers.

4. The X-ray imaging device of claim 2, wherein:
the X-ray detector includes at least one additional optical fiber that is optically coupled to a second end of the at least one optical fiber to transmit light from the quantum dots.

5. The X-ray imaging device of claim 1, wherein:
the cavities have sidewalls defining a cross-sectional shape selected from the group of shapes consisting of cylindrical, hexagonal, and square.

6. The X-ray imaging device of claim 1, wherein:
the first surface includes a peripheral edge;
the material defines a plate including the second surface opposite the first surface and defining a thickness therebetween, and wherein the thickness is much less than a dimension across the first surface taken from opposite portions of the peripheral edge.

7. The X-ray imaging device of claim 6, wherein:
the material comprises at least one of glass, polymeric material, silicon, and quartz.

8. The X-ray imaging device of claim 1, wherein:
the quantum dots are crystallized to form a solid material that fills a portion of the cavities.

9. The X-ray imaging device of claim 1, wherein:
the quantum dots are disposed in the cavities.

10. The X-ray imaging device of claim 1, wherein:
the cavities are about two microns across.

11. The X-ray imaging device of claim 10, wherein:
the cavities are disposed in a uniform pattern.

12. The X-ray imaging device of claim 1, including:
a visible light detector configured to generate an image of at least a portion of the first surface.

13. The X-ray imaging device of claim 12, wherein:
the visible light detector comprises a digital camera and optics.

14. The X-ray imaging device of claim 1, wherein:
a quantity of visible photons emitted by the quantum dots upon interaction with X-ray radiation varies as a function of a temperature of the quantum dots whereby the quantity of photons that are emitted can be utilized to determine a temperature of the quantum dots.

15. A radiation detector, comprising:
a microstructured material having a thickness and including a first surface, a second surface opposite the first surface, and a plurality of cavities extending from openings defined in the first surface into the material and extending toward the second surface a distance that is less than the thickness of the material; and
a plurality of quantum dots disposed in the cavities, wherein the quantum dots are configured to absorb radiation and emit visible photons upon interaction with radiation.

16. The radiation detector of claim 15, wherein:
the quantum dots are configured to emit visible photons upon interaction with at least one of electron radiation, gamma radiation, beta radiation and alpha radiation.

17. The radiation detector of claim 15, wherein:
the first surface includes a peripheral edge, and wherein the thickness is much less than a dimension across the first surface taken from opposite portions of the peripheral edge.

18. The radiation detector of claim 15, wherein:
the material comprises at least one of glass, polymeric material, silicon, and quartz.

19. A method of making a radiation detector, the method comprising:
providing a liquid solution comprising quantum dots;

drawing the liquid solution into at least one cavity utilizing capillary and/or vacuum action; and solidifying the liquid solution in the at least one cavity.

20. The method of claim 19, wherein:

the quantum dots are configured to emit visible photons upon interaction with X-rays;

the liquid solution includes at least about 30 wt % quantum dots at the time the liquid solution is drawn into the at least one cavity; and the liquid solution is solidified by evaporation.

* * * * *